Aug. 19, 1969     I. B. HENSLEY     3,462,050

ADJUSTABLE WIG MOUNT

Filed July 22, 1965

INVENTOR.
IRENE B. HENSLEY
BY
*Hoffmann and Yount*
ATTORNEYS

United States Patent Office 3,462,050
Patented Aug. 19, 1969

3,462,050
ADJUSTABLE WIG MOUNT
Irene B. Hensley, 3274 Canterbury Road,
Westlake, Ohio 44145
Filed July 22, 1965, Ser. No. 473,926
Int. Cl. D06c 15/00
U.S. Cl. 223—66
10 Claims

ABSTRACT OF THE DISCLOSURE

An adjustable wig mount for both setting and stretching wigs including a base with a pair of relatively movable non-compressible pin receptive wig blocks having a general overall configuration of that of the human head supported by a pair of spaced apart upstanding fixed supports located on the base. A support means is provided for rotatably supporting said base.

---

The present invention relates to wig mounts, and more particularly to an adjustable wig mount usuable for both setting and stretching wigs of various head sizes.

An important object of the present invention is to provide a novel adjustable wig mount of a highly practical form and which is usable for both setting and stretching wigs of various head sizes.

Another object of the present invention is to provide a new and improved adjustable wig mount of the character described including a support means for rotatably supporting the wig blocks and which support means is so constructed and arranged that the wig blocks can be readily rotated to any desired position relative thereto and then locked in the desired position.

Yet another object of the present invention is to provide a novel adjustable wig mount usable for both setting and stretching wigs comprising a base, a pair of relatively movable wig blocks supported by said base for relative movement toward and from one another and a support means for rotatably supporting said base including a locking means operatively connected with said base to prevent the latter from being rotated relative to the support means, and which adjustable wig mount is so constructed and arranged that the base and wig blocks supported thereby can be readily rotated and locked in any desired working position relative to the support means and that wigs of various head sizes can be readily and easily mounted thereon and set and/or stretched.

A still further object of the present invention is to provide a novel adjustable wig mount usuable for both setting and stretching wigs, as defined in the preceding object, wherein the wig blocks are detachably connected to their supports so that the individual wig blocks can be readily connected thereto and disconnected therefrom to facilitate replacement thereof.

Another object of the present invention is to provide a new and improved wig mount of the character described wherein the wig blocks are made from a soft wood, such as balsa wood, and are provided with a self-sealing external cover or coating which prevents the soft wood from being contaminated, such as by water, etc. when wigs are mounted thereon and being set, and which automatically seals any openings made by the pins, etc. used for mounting the wigs.

Further objects and advantages of the present invention will be apparent from the following detailed description thereof made with reference to the accompanying drawings forming a part of the present specification, and wherein like parts are given the same reference numerals, and in which.

Figure 1:
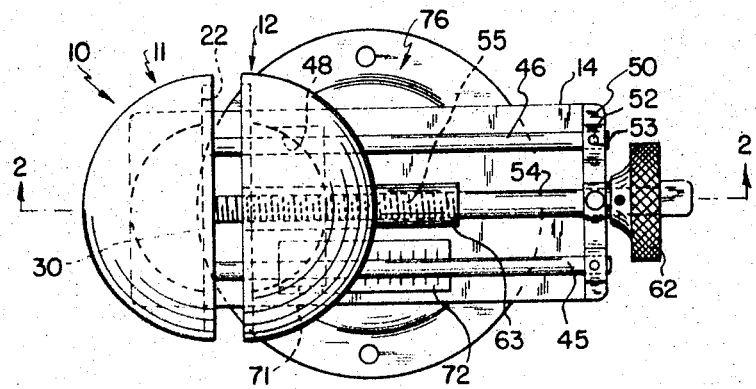
FIG. 1 is a top plan view of an adjustable wig mount embodying the present invention.

Referring to the drawings, a preferred embodiment of the adjustable wig mount 10 of the present invention is there shown. The adjustable wig mount 10 comprises, in general, a pair of relatively movable wig blocks 11 and 12 supported by a base 14 and onto which wigs of different head sizes are adapted to be mounted for the purposes of setting, i.e., curling and/or otherwise conditioning the hair thereof, and/or stretching the same. The wig block 11 is stationary and fixed relative to the base 14 and the wig block 12 is adjustably supported for movement relative to the base 14 toward and from the wig block 11 to form different head sizes.

The wig blocks 11 and 12 together have an overall configuration generally that of a human head. Each of the wig blocks 11 and 12 has a flat side surface 17 and a rounded exterior which comprises an upper head portion 18 and a lower neck portion 20 shaped so as to form a half-head and half-neck, respectively. The side surfaces 17 of the wig blocks 11 and 12 face one another and each side surface is recessed or set back, as indicated by reference numeral 22, to define a peripherally extending flange 23 projecting outwardly therefrom.

The wig blocks 11 and 12 are preferably made from a soft wood, such as balsa wood, although any suitable or conventional non-compressible or substantially non-compressible material may be employed for forming the wig blocks. The use of a soft wood, such as balsa wood, provides a wig block which is non-compressible and pin receptive, that is, one which is relatively rigid so that it will not deform or substantially deform while a wig is being stretched but yet soft enough to enable it to be readily penetrated by pins, etc. which may be employed when mounting the wigs thereon. The wig blocks 11 and 12 are further provided with a relatively thick self-sealing external coating, such as a silicone coating 24. For example a coating bearing the trade name "Silastic" may be used. The silicone coating prevents the soft wood from being contaminated by water, etc., while the wigs are being set and automatically seals any holes which are made due to the insertion of pins when the wigs are mounted on the wig blocks.

The wig block 11 is detachably connected to an upright support plate 28 mounted on the base 14. The plate 28 has an upper portion 30 which is shaped complementary with the recess 22 and is snugly received therein so that the plate 28 will be flush with the end of the peripheral flange 23. The wig block 11 is detachably connected to the upper portion 30 of the plate 28 by a countersunk screw 31 which extends through an opening in the plate 28 and is threadably engaged with a threaded opening in the wig block 11. The plate 28 is mounted at its lower end to an upstanding support portion 32 formed integral with the base 14 at one end thereof by screws 33. The neck portion 20 of the wig block 11 has a flat bottom 34 which is supported on the flat top surface of the upstanding support portion 32.

The wig block 12 is detachably connected to an upright support plate 35 mounted on a slidable support means or block 36, and in the same manner that the wig block 11 is detachably connected to the support plate 28. The upright plate 35 is mounted at its lower end on the support block 36 by screws 38. The neck portion 20 of the wig block 12 has a flat bottom 40 which is supported on the flat top surface of the support block 36.

Figure 2:
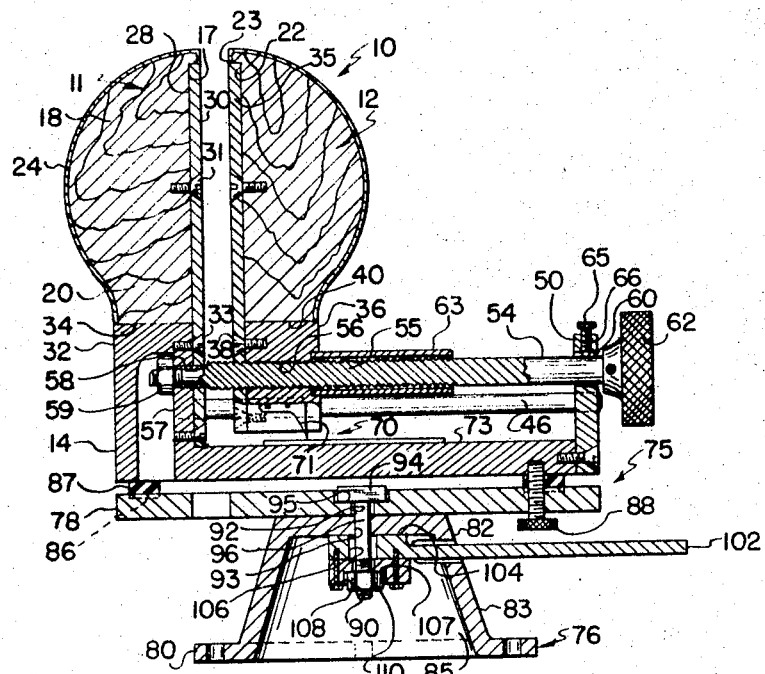
FIG. 2 is a vertical cross-sectional view taken approximately along lines 2—2 of FIG. 1.
Figure 3:
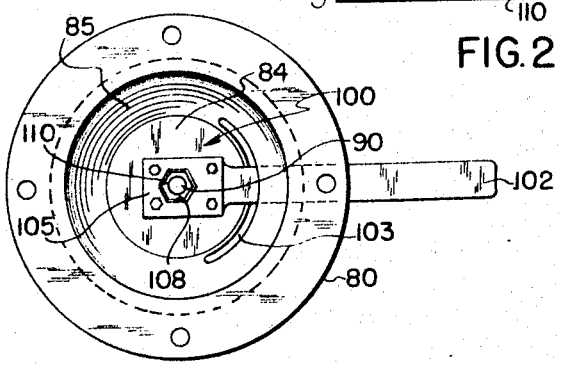
FIG. 3 is a bottom plan view of the adjustable wig mount shown in FIG. 1.

The support block 36 is slidably supported on a pair of laterally spaced guide rods 45 and 46 for movement relative to the base 14 toward and from the wig block 11. Each of the rods 45 and 46 extends through an opening 48 in the support block 36 and is supported at its opposite ends by the plate 28 and an upright support plate 50 bolted or otherwise secured to the right end of the base 14, as viewed in FIG. 2. To this end, the support plates 28 and 50 have aligned openings for receiving and supporting the opposite ends of the rods 45 and 46. Each of the rods 45 and 46 is retained or locked in its supporting portion by a set screw 52 which is threadably engaged with a threaded opening 53 in the plate 50 extending transversely to and communicating with the rod receiving opening therein.

Movement of the wig block 12 relative to the base 14 toward and from the wig block 11 is effected by turning or rotating a screw shaft 54. The screw shaft 54 at its opposite ends is rotatably supported by the upright portion 32 of the base 14 and the upright support plate 50 and has a threaded portion 55 thereon threadably engaged with a threaded opening 56 extending through the support block 36. The left end of the screw shaft 54, as viewed in FIG. 2, extends through aligned openings in the plate 28 and the adjacent side wall 57 of the upright portion 32 of the base 14 and is rotatably supported therein by a bushing 58 fixed within the openings. A suitable lock nut 59 on the end of the screw shaft 54 is provided for retaining the end thereof within bushing 58. The right end of the screw shaft 54 extends through an opening 60 at the upper end of the plate 50 and has a knurled knob 62 fixed to the end thereof for manually rotating the screw shaft 54. Attached to the support block 36 and extending toward the plate 50 is a sleeve 63 for covering the threaded portion 55 of the screw shaft 54.

From the foregoing, it will be apparent that when the knob 62 is turned or rotated to rotate the screw shaft 54, the threaded connection between the screw shaft 54 and the support block 36 causes the support block 36 and the wig block 12 mounted thereon to be moved relative to the wig block 11. A knurled head screw 65 threadably engaged in a threaded opening 66 in the top of the support plate 50 may be provided for locking the screw shaft 54 against rotation when the wig block 12 has been adjusted to the desired position relative to the wig block 11.

To enable the adjustable wig mount 10 to be readily adjusted to the proper head size desired, an indicator means 70 is provided. The indicator means 70 comprises a downwardly extending pointer 71 secured to one side of the support block 36 and a graduated scale 72 for indicating head sizes secured to the flat horizontal portion 73 of the base 14.

The adjustable wig mount 10, in the preferred embodiment, includes a support means 75 for rotatably supporting the base 14 to enable the latter and the wig blocks 11 and 12 to be rotated to any desired working position. The support means 75, in the illustrated embodiment, comprises a stationary support member or base 76 and a rectangularly shaped support member 78, to which the base 14 of the adjustable wig mount 10 is adapted to be mounted, rotatably supported by the stationary support member 76. The stationary support member 76 comprises an annular bottom flange 80 which is adapted to be bolted or otherwise attached to a suitable support, such as a table, and an integrally formed inverted cup shaped upper portion 82 having an annular side wall 83 and a flat upper or top wall 84 defining an annular recess 85. The support member 78 on its upper side has a recess 86 located adjacent each of the four corners thereof which are each adapted to receive a rubber mounting pad 87 secured to the bottom of the base 14. The base 14 is adapted to be securely held on the support member 78 by a knurled head screw 88 extending through an opening in the support member 78 and threadably engageable with an aligned threaded opening in the base 14.

The support member 78 is slidably supported on the upper wall 84 and rotatably connected to the stationary support member 76 by a bolt 90. The bolt 90 projects through aligned apertures 92 and 93 in the support member 78 and the upper wall 84, respectively, and extends within the recess 85. The bolt 90 has a round head 94 which is rotatably received within a counterbored portion 95 of the opening 93 and a non-circular or polygonal shaped shank portion 96. The opening 93 in the wall 84 is shaped complementary with the shank portion 96 to prevent the bolt 90 from rotating relative to the stationary support member 76. From the above, it is apparent that the support member 78 can be rotated relative to the stationary support member 76 by virtue of the rotatable connection between the head 94 of the bolt 90 and the support member 78.

The support means 75 includes a locking means, designated generally by reference numeral 100, for locking the support member 78 against rotation relative to the support member 76. The locking means 100 is effective to tightly clamp the support members 78 and 76 together to thereby lock the support member 78 against rotation relative to the support member 76. The locking means 100 comprises an elongated actuating member or handle 102 extending through a circumferentially extending slot 103 in the side wall 83 of the support member 76 and having its inner end rotatably or pivotally connected with the shank 96 of the bolt 90. The inner end of the handle 102 is here shown as having an upwardly extending boss 104 which is adapted to engage the upper wall 84 and a plate 105 bolted or otherwise detachably connected to its underside. The inner end of the handle 102 and the plate 105 have aligned oversized openings 106 and 107 through which the shank 96 of the bolt 90 extends. The plate 105 has a hexagonal socket or recess 108 around the opening 107 at its lower end and in which a hexagonal nut 110 threadably connected to the threaded end of the shank 96 of the bolt 90 is received. The nut 110 supports and retains the handle 102 on the bolt 90 within the socket 108 and enables the handle 102 to act as a wrench to cause the nut 110 to be rotated and thereby move the nut 110 axially relative to the bolt 90 when the handle 102 is moved within the slot 103.

To lock the support member 78 against rotation relative to the stationary support member 76, the handle 102 is moved in a counter-clockwise direction in the slot 103. Movement of the handle 102 in this direction causes the nut 110 to be rotated and moved axially relative to the bolt 90 toward the upper wall 84. As the nut 110 is moved toward the upper wall 84, the handle 102 is moved axially relative to the bolt by reason of the bearing engagement between the nut 110 and the bottom of the socket 108 until the boss 104 thereof engages the upper wall 84. When the boss 104 of the handle 102 is in tight engagement with the upper wall 84 the head 94 of the bolt 90 is drawn into tight engagement with the support member 78 to tightly clamp the latter to the upper wall 84 of the support member 76. The clamping pressure exerted is such that the support member 78 is effectively locked to the stationary support member 76. To release the clamping pressure and permit the support member 78 to be rotated relative to the stationary support member 76, the handle 102 is moved in a clockwise direction which causes the nut 110 to be moved in a direction away from the upper wall 84 and release the clamping pressure. In view of the foregoing, it can be seen that the base 14 can be rotated to any desired working position by rotating the member 78 relative to the base 76 and then retained or locked in that position.

It will, of course, be understood that the support means 75 could be used for rotatably supporting various types of wig forms or mounts including non-adjustable wig mounts. Moreover, a spindle could be mounted or fixed on the rotatable support member 78 for operative connection with conventional wig mounts of the type having a spindle receiving opening in their base.

In view of the foregoing, it can be seen that a novel adjustable wig mount of an economical construction and highly practical form and usable for both setting and/or stretching wigs has been provided. Moreover, it can be seen that a novel wig mount having wig blocks made from a soft wood, such as balsa wood, and self-sealing external coating which prevents the soft wood from being contaminated when wigs are mounted and set thereon has been provided. Additionally, it can be seen that a novel adjustable wig mount having a support means for rotatably supporting the wig blocks thereon and which is so constructed and arranged that the wig block can be readily and easily rotated to any position relative thereto and locked in the desired position has been provided.

It is to be understood that the term "non-compressible pin receptive material" as used in the specification and claims encompasses any suitable material which has a rigidity such that it will not deform or significantly deform during a wig stretching operation and which is pin receptive, i.e., which can be readily penetrated by pins or the like.

Having described my invention, I claim:

1. An adjustable wig mount for use in setting and stretching wigs of various head sizes comprising, a base, a pair of upstanding relatively movable non-compressible pin receptive wig blocks supported by said base, each of said blocks having an outer covering of silicone coating which provides a self-sealing material to protect said wig blocks against exposure to fluids after pins have been inserted into and removed from said wig blocks, one of said wig blocks being fixed relative to said base and the other of said wig blocks being movable relative to said base toward and from said one wig block, said wig blocks together having an overall configuration generally that of a human head, and means operatively connected with said other wig block for moving said other wig block relative to said base toward and from said one wig block to thereby enable said wig mount to be used for stretching wigs of various head sizes.

2. An adjustable wig mount, as defined in claim 1, wherein each of said non-compressible pin receptive wig blocks includes a soft wood core under said outer covering.

3. An adjustable wig mount for use in setting and stretching wigs of various head sizes comprising, a base having a pair of spaced apart upstanding fixed supports thereon, a support block slidably mounted on said base for movement between said fixed supports, a pair of plate supports one of which is detachably connected to one of said upstanding fixed supports and the other of which is detachably connected to said support block, a pair of relatively movable non-compressible pin receptive wig blocks each of which includes a peripheral flange thereon for locating the wig blocks relative to said plate supports and for providing each of said wig blocks with a continuous pin receptive outer surface, and a rotatable screw shaft having its opposite ends rotatably supported by said upstanding fixed supports and having a threaded portion threadably connected with said support block for moving said support block and the other of said wig blocks relative to said one wig block.

4. An adjustable wig mount, as defined in claim 3 wherein said support block is slidably supported on a pair of laterally spaced guide rods having their opposite ends supported by said fixed upright supports.

5. An adjustable wig mount, as defined in claim 4, including a threaded member threadably connected with the other of said fixed supports for locking said screw shaft against rotation.

6. An adjustable wig mount and wig stretcher, as defined in claim 4 including a graduated head size scale fixed to said base and a pointer fixed to said support means for indicating the head size to which the wig blocks have been adjusted.

7. An adjustable wig mount and wig stretcher, as defined in claim 3, including a support means for rotatably supporting said base, said support means including a stationary support member and a rotatable support member rotatably supported by said stationary support member and operatively connected with said base, and locking means carried by said support means for locking said rotatable support member against rotation relative to said stationary support member.

8. An adjustable wig mount for use in setting and stretching wigs of various head sizes comprising, a base, a pair of upstanding relatively movable non-compressible pin receptive wig blocks supported by said base for relative movement toward and from one another, means operatively connected with at least one of said wig blocks for moving one of said wig blocks toward and from the other, and a support means for rotatably supporting said base and wig blocks, said support means including a stationary support member and a rotatbale support member rotatably supported by said stationary support member and operatively connected with said base to enable said wig blocks to be rotated relative to said base and locking means carried by said support means for locking said rotatable member against rotation relative to said stationary support member to thereby prevent rotation of said wig blocks relative to said base.

9. A wig mount as defined in claim 8, wherein said wig blocks have a head portion and a neck portion, and wherein said wig blocks have a soft wood core.

10. A wig mount for use in setting and stretching wigs, said wig mount including block means having a configuration similar to that of a human head and formed of a material into which pins can be readily inserted manually to thereby position and hold a wig on said wig mount, and means providing a self-sealing layer over said block means to prevent said block means from being exposed to fluids during use of said wig mount, said means providing a self-sealing layer being formed of silicone coating through which pins can be readily pressed manually.

References Cited

UNITED STATES PATENTS

| | | | |
|---|---|---|---|
| 415,373 | 11/1889 | Weston | 132—56 |
| 686,186 | 11/1901 | Alarme | 132—56 |
| 1,013,539 | 1/1912 | Faerber | 132—56 X |
| 3,132,778 | 5/1964 | Leclabart | 223—66 |
| 724,227 | 3/1903 | Wolf | 223—25 |
| 1,581,940 | 4/1926 | Margolin | 223—25 |
| 1,634,051 | 6/1927 | Parsch | 223—25 |
| 1,910,394 | 5/1933 | Kalajian | 223—24 |
| 3,198,408 | 8/1965 | Benner | 248—415 X |
| 3,300,108 | 1/1967 | Schumer | 223—66 |

JORDAN FRANKLIN, Primary Examiner

GEORGE V. LARKIN, Assistant Examiner

U.S. Cl. X.R.

248—177